United States Patent
Bakshi et al.

(10) Patent No.: US 12,513,013 B2
(45) Date of Patent: Dec. 30, 2025

(54) DYNAMIC CROSS-NODE MULTIDIMENSIONAL HASHCHAIN NETWORK-BASED META-CONTENT ENABLER FOR REAL-TIME CONTENT BASED ANOMALY DETECTION

(71) Applicant: Bank of America Corporation, Charlotte, NC (US)

(72) Inventors: Sakshi Bakshi, New Delhi (IN); Pushkar Taneja, Hyderabad (IN); Shilpi Choudhari, Hyderabad (IN); Saurabh Rajpal, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 169 days.

(21) Appl. No.: 18/416,228

(22) Filed: Jan. 18, 2024

(65) Prior Publication Data
US 2025/0240180 A1   Jul. 24, 2025

(51) Int. Cl.
*H04L 9/00* (2022.01)
*G06F 21/62* (2013.01)

(52) U.S. Cl.
CPC ............ *H04L 9/50* (2022.05); *G06F 21/6245* (2013.01)

(58) Field of Classification Search
CPC .............................. H04L 9/50; G06F 21/6245
See application file for complete search history.

(56) References Cited

U.S. PATENT DOCUMENTS

| | | | |
|---|---|---|---|
| 8,316,237 B1 | 11/2012 | Felsher et al. | |
| 2020/0210390 A1* | 7/2020 | Huang | G06F 16/9566 |
| 2022/0067301 A1* | 3/2022 | Pottier | G06N 5/022 |
| 2023/0034512 A1* | 2/2023 | Rabiah | H04L 63/12 |

FOREIGN PATENT DOCUMENTS

| | | |
|---|---|---|
| CN | 106575166 B | 11/2022 |
| KR | 101554997 B1 | 9/2015 |

* cited by examiner

*Primary Examiner* — Linglan Edwards
*Assistant Examiner* — Saron Matthewos Worku
(74) *Attorney, Agent, or Firm* — Banner & Witcoff, Ltd.

(57) ABSTRACT

Systems and processes are disclosed for a multidimensional, cross-node, hashchain, network-based Meta-Content Enabler (MCE) providing real time anomaly detection and impact analysis. Unique hexadecimal sequence identifiers are generated based on real time indexing and categorization to create a golden virtual metadata copy used by AI engine to determine content score to identify the degree of deviation therefrom, and to identify the hexadecimal nodes in the hashchain. The identified discrepancy is verified across cross-node hashchains to give end to end parallel impact analysis on the anomaly. By leveraging real-time monitoring, multidimensional verification, and blockchain-based storage, the system provides a robust and efficient solution for ensuring the accuracy and integrity of user activities. The system integrates privacy-preserving techniques, such as differential privacy or secure multi-party computation, to protect sensitive metadata. These techniques enable the system to analyze and process the metadata while preserving the privacy of individual users.

20 Claims, 5 Drawing Sheets

FIG. 2

DYNAMIC CROSS-NODE MULTIDIMENSIONAL HASHCHAIN NETWORK-BASED META-CONTENT ENABLER FOR REAL-TIME CONTENT BASED ANOMALY DETECTION

TECHNICAL FIELD

The present disclosure relates to information security and, more particularly, to systems, methods, and apparatus for ensuring data integrity by scanning of software or data or otherwise monitoring data to prevent or detect attacks.

DESCRIPTION OF THE RELATED ART

Data security and privacy breaches are a significant concern for institutions, especially when communicating with external parties like vendors, clients, and other institutions. A lot of sensitive and confidential information is exchanged during these interactions, increasing the risk of data exposure and potential regulatory violations. Recent instances of privacy breaches emphasize the importance of addressing this issue promptly and effectively.

To mitigate these risks and enhance data security, institutions traditionally implemented a data governance framework that encompasses various measures. One is data classification and access control to clearly classify sensitive data and implement access controls to restrict access to authorized personnel only. This attempts to limit data access to those with legitimate purposes have it, minimizing the risk of unauthorized exposure.

Another is use of secure communication channels. Establishing secure communication channels, such as encrypted email or dedicated portals, for exchanging sensitive information with external parties, helps protect data confidentiality and integrity during transmission.

Data loss prevention solutions have been used to attempt to monitor and prevent the accidental or intentional transfer of sensitive data outside of authorized channels. Such tools can detect and block data transfers that violate predefined rules, reducing the likelihood of data breaches.

Data encryption has been used to encrypt sensitive data at rest and in transit to safeguard it against unauthorized access, even in the event of a data breach. Encryption techniques like AES and RSA can protect data from being read or used by unauthorized parties.

Data breach prevention and incident response measures have been used, such as intrusion detection and prevention systems (IDS/IPS), to identify and block malicious activity that could lead to data breaches. Additionally, comprehensive incident response plans have been used to effectively address and remediate data breaches if they occur. But this does not prevent the problem, it only attempts to minimize the damage caused by the problem.

By implementing these measures, institutions have attempted to reduce the risk of data breaches and protect the sensitive information entrusted to them.

However, the foregoing is insufficient and a more robust and effective solution that can review the accuracy and integrity of the user data processing, specifically activities that result in data transmission to external parties, is needed to ensure protection of sensitive data and preserve the privacy of every individual client.

SUMMARY OF THE INVENTION

Considering the foregoing, the following presents a simplified summary of the present disclosure to provide a basic understanding of various aspects of the disclosure. This summary is not limiting regarding the exemplary aspects of the inventions described and is not an extensive overview of the disclosure. It is not intended to identify key or critical elements of or steps in the disclosure or to delineate the scope of the disclosure. Nor is it intended to imply or require that any such steps or elements, in this summary or elsewhere in this disclosure, be implemented or executed in any particular order. Instead, as understood by a personal of ordinary skill in the art, the following summary merely presents concepts of the disclosure in a simplified form as a prelude to the more detailed description below. Sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

Under one or more arrangements of the non-limiting sample disclosures herein, solutions are provided to address one or more of the above shortcomings by utilizing a multidimensional, cross-node, hash-chain, network-based, meta-content enabler (MCE) that provides real-time anomaly detection and impact analysis. The system utilizes real-time monitoring, multidimensional verification, and blockchain-based storage to provide a robust and efficient solution for ensuring data accuracy and integrity. It provides real-time anomaly detection and impact analysis of user activities. The invention creates and utilizes a "golden" metadata copy of all user activities, which serves as a reference point for identifying deviations and assessing their implications.

Multidimensional cross-node hashchains are used in a network of interconnected hashchains to store and index metadata efficiently and in a scalable manner. Arranging these hashchains in a multidimensional structure allows for faster metadata indexing and retrieval. The categorized hash nodes are arranged in real-time hashchains with overlapping categories forming extended chains. This extended hashchain entanglement forms cross-node hashchain networks that makes anomaly detection and real time impact analysis quicker and information sync up easier. Any anomaly detected is processed from all dimensions of reconciliation in parallel.

Real-time monitoring, indexing, and categorization is utilized. Metadata is continuously indexed and categorized in real time, enabling immediate anomaly detection and impact analysis. This real-time processing ensures that anomalies are identified promptly, and their effects are assessed swiftly. The real-time processing of metadata allows for immediate indexing and categorization of issues related to content. This feature enables prompt identification and verification of related data, enhancing the speed and efficiency of the content verification process.

User activities are continuously monitored in real time, enabling immediate identification of anomalies as they occur. Prompt detection minimizes the impact of anomalies and facilitates timely corrective actions. This immediately analyzes the collected data in real time, providing insights into the nature and extent of anomalies. This real-time analysis allows for rapid decision-making and informed responses to potential threats.

The MCE component working can operate in the background to continuously monitor content rectification during application usage from all directions using AI transformers.

This feature allows for real-time identification of discrepancies or inconsistencies. By proactively flagging these discrepancies, the system supports the content verification process by improving the accuracy and reliability of the shared information. The MCE employs AI transformers to enhance the accuracy and reliability of content verification. AI transformers are trained on massive amounts of text data, enabling them to detect subtle nuances and patterns in language. This sophistication allows the MCE to identify discrepancies that might go unnoticed by traditional methods. When discrepancies are identified, the MCE proactively flags them to the content verification process. This proactive approach ensures that potential issues are addressed promptly, preventing them from causing harm or propagating misinformation.

Each piece of metadata generated by MCE is assigned a unique hexadecimal identifier. This identifier serves multiple purposes, including tracking metadata across the hashchain network, facilitating anomaly identification, and enabling efficient data retrieval. The advanced hexadecimal identifiers assigned to indexed cases are not simply random values. They are generated using an algorithm that incorporates various attributes from the metadata. This approach ensures uniqueness and integrity of the identifiers, facilitating efficient referencing and retrieval of specific content-related cases.

An AI engine is used for deviation scoring. MCE incorporates an AI engine that analyzes each piece of metadata and assigns it a score based on its deviation from the golden metadata copy. This scoring mechanism helps identify anomalies and prioritize them for further investigation. The real-time anomaly detection system uses a "golden" metadata copy as a reference point to identify deviations and assess their implications. When a discrepancy is identified, the MCE verifies it across multiple cross-node hash chains to ensure accuracy and validity of the content associated with user activities.

Multidimensional verification is accomplished by cross-node verification and cross-referencing. For cross-node verification, the MCE verifies anomalies across multiple cross-node hashchains, ensuring the accuracy and validity of anomaly detection. This multidimensional verification process reduces the likelihood of false positives and provides a higher level of assurance in the system's findings. For cross-referencing, the MCE cross-references anomalies with various metadata sources, such as golden metadata sets and historical user behavior patterns. This cross-referencing process provides additional context for anomaly assessment and helps identify the root causes of irregularities. Stated differently, cross-node verification is utilized to ensure the accuracy and validity of identified anomalies. This is accomplished by MCE verifying anomalies across multiple cross-node hashchains. When a discrepancy is identified, the MCE verifies it across multiple cross-node hash chains to ensure accuracy and validity of the content associated with user activities. This cross-verification process provides an extra layer of assurance in anomaly detection.

MCE integrates privacy-preserving techniques, such as differential privacy and secure multi-party computation, to safeguard sensitive metadata. These techniques enable the system to analyze and process metadata while maintaining the privacy of individual users.

Regarding blockchain-based storage, an immutable ledger is used to maintain an immutable ledger of user activities and metadata. This immutable ledger ensures the integrity and tamper-proof nature of the data, preventing unauthorized modifications or data manipulation. The MCE blockchain provides transparency and traceability, allowing for auditing and tracking of user activities and metadata across the network. This transparency enhances accountability and facilitates investigations in case of discrepancies.

Various sample core innovations disclosed are summarized below and include intelligent content discrepancy detection in which the MCE component utilizes advanced algorithms and machine learning techniques to identify discrepancies in content. The real-time information sharing helps to have a synced up validation. Intelligent content discrepancy detection is using artificial intelligence (AI) and machine learning (ML) techniques to identify inconsistencies, inaccuracies, or anomalies in content. This can be applied to a variety of content types, including text, images, videos, and audio. The MCE component is a key part of the intelligent content discrepancy detection process. The MCE uses advanced algorithms and ML techniques to identify discrepancies in content. It can do this by analyzing the content for patterns, anomalies, and inconsistencies. The MCE also uses real-time information sharing to help ensure that all content is synchronized and validated. This means that any discrepancies that are identified can be corrected immediately.

Another is real time content validation and fixing to identify the degree of variation and solution/right recommendation to the problem and closely integrated with cross-node network to form the knowledge graphs basis golden metadata. It plays a central role in identifying anomalies, determining the degree of variation, and recommending solutions. The MCE's effectiveness stems from its integration with a cross-node network and its utilization of golden metadata. In identifying anomalies, the MCE continuously monitors content and identifies anomalies using advanced algorithms and machine learning techniques. It analyzes content for deviations from predefined standards or patterns, flagging potential inconsistencies or inaccuracies. For determining variation, once an anomaly is identified, the MCE assesses the severity of the deviation. It employs sophisticated techniques to quantify the degree of variation, determining the extent to which the content deviates from the expected norms. Regarding recommending solutions, based on the identified anomalies and their assessed severity, the MCE recommends solutions or right recommendations to address the issues. It utilizes its knowledge base and access to golden metadata to suggest corrective actions or provide guidance for content improvement. For cross-node network integration the MCE operates within a closely integrated cross-node network, enabling real-time collaboration and knowledge sharing. This network facilitates the exchange of anomaly detection results, solution recommendations, and golden metadata across multiple nodes, enhancing the system's overall effectiveness. Regarding the golden metadata, it is a fundamental basis and a reference point representing the ideal or expected state of content. This metadata serves as a benchmark against which the MCE compares actual content, enabling the identification of discrepancies and the formulation of solutions.

Another is the real-time indexer, which processes and indexes the metadata cases into categories based on predefined criteria or dynamically adapting rules. The real-time indexer is a system that indexes metadata in real time. This means that the metadata is indexed as soon as it is created or updated. This allows for fast and efficient retrieval of metadata, which is essential for many applications. It can be used for content management aspects of this disclosure so it can be displayed and managed efficiently. It can also be used for data warehousing aspects of this disclosure to index data for quick analysis. It can also be used by security system aspects of this disclosure so they can be monitored and analyzed for potential threats.

The real-time indexer works by continuously monitoring for changes to data. When a change is detected, the indexer updates the metadata for the affected data. This updated metadata is then added to the index. Real-time indexers can be configured to use predefined criteria or dynamically adapting rules to index metadata. For example, a real-time indexer for a search engine might use predefined criteria to index the title and meta description of web pages. A real-time indexer for a security system can use dynamically adapting rules to index events based on their severity.

Another is the dynamic multidimensional cross-node hash chain, which is not limited to "static" dimensions. Instead, it dynamically adapts to evolving data and incorporates new dimensions as needed. This flexibility allows for a scalable and adaptable structure, accommodating changing data requirements and ensuring compatibility with future enhancements.

Stated differently, the dynamic multidimensional cross-node hash chain is a significant component of the MCE system. It provides a flexible and adaptable structure for storing and indexing metadata, enabling the MCE to effectively manage evolving data and adapt to changing requirements.

Sample key features of the dynamic multidimensional cross-node hash chain include dynamic dimensionality that, unlike traditional hash chains constrained to fixed dimensions, the dynamic multidimensional cross-node hash chain can dynamically adjust its dimensions to accommodate expanding data requirements. This flexibility ensures that the system can handle increasing data volume and complexity without compromising its effectiveness.

Another is adaptive incorporation of new dimensions. As new data dimensions emerge or existing ones evolve, the dynamic hash chain seamlessly integrates them into its structure. This adaptability ensures that the system remains relevant and capable of managing the latest data formats and structures. Scalability and adaptability is another. The dynamic nature of the hash chain enables the MCE to scale effectively as data volume grows and requirements change. The system can add new nodes or adjust existing ones without disrupting operations, ensuring its ability to handle evolving data landscapes.

The dynamic approach of the hash chain makes it compatible with future enhancements and adaptations of the MCE system. As new features or capabilities are introduced, the hash chain can readily incorporate them without compromising its integrity or performance.

Another is hexadecimal identifiers with semantic meaning in which the hexadecimal identifiers assigned to indexed cases carry not only uniqueness but also semantic meaning. Using hexadecimal identifiers with semantic meaning in the MCE system serves two important purposes. The first is unique Identification, because each hexadecimal identifier uniquely identifies a specific metadata case, enabling efficient tracking and retrieval of metadata across the system's hashchain network. This unique identification is crucial for anomaly detection, impact analysis, and data governance. The second is semantic meaning. Beyond mere uniqueness, the hexadecimal identifiers encode semantic meaning, providing contextual information about the metadata they represent. This semantic enrichment enhances the system's ability to interpret and analyze metadata effectively, facilitating more informed decision-making.

The combination of unique identification and semantic meaning in hexadecimal identifiers offers several advantages. One is context-aware processing. The semantic meaning embedded within the hexadecimal identifiers allows the system to process and analyze metadata in a context-aware manner, considering the specific characteristics and relationships of the data. By understanding the semantic meaning of the metadata, the system can detect anomalies more accurately and identify patterns that might otherwise go unnoticed and provides enhanced anomaly detection. When anomalies are detected, the semantic information associated with the hexadecimal identifiers helps assess the potential impact of the anomalies and prioritize corrective actions. The semantic enrichment of hexadecimal identifiers facilitates data governance by enabling the system to categorize and organize metadata effectively, ensuring adherence to data policies and regulations.

The system integrates privacy-preserving techniques, such as differential privacy or secure multi-party computation, to protect sensitive metadata. These techniques enable the system to analyze and process the metadata while preserving the privacy of individual users. This ensures compliance with privacy regulations and builds trust among users. Integrating privacy-preserving techniques into MCE is a crucial step in ensuring the protection of sensitive user data while maintaining the system's effectiveness in analyzing and processing metadata. Privacy-preserving techniques in MCE can include differential privacy and secure multi-party computation (SMPC). The technique of differential privacy introduces controlled noise into statistical queries over the metadata, enabling the system to extract meaningful insights without revealing individual user information. SMPC allows multiple parties to jointly analyze and process sensitive data without revealing their individual inputs or intermediate results. This technique ensures that sensitive data remains confidential even when multiple parties are involved in the analysis.

A further is extensibility and interoperability. The plugin is designed to be extensible and interoperable with other systems and applications. it can integrate with existing content verification services, identity providers, or third-party platforms to enhance its functionality and leverage external resources for more accurate content verification. Extensibility and interoperability allow the MCE to adapt to evolving needs and integrate seamlessly with other tools and platforms. The MCE system is designed to be extensible, allowing for the addition of new features and functionalities without disrupting its core operations. This extensibility enables the system to keep pace with changing requirements and adapt to emerging technologies, ensuring its long-term relevance. The MCE system is interoperable with other systems and applications, facilitating the exchange of data and collaboration across different platforms. This interoperability allows the system to leverage the strengths of other tools and integrate seamlessly into existing workflows, enhancing its overall effectiveness.

Thus, the disclosed inventions provide advanced capabilities for metadata analysis, real-time indexing, and content verification. Integrating machine learning, NLP, privacy-preserving techniques, blockchain, and smart contracts enhances the accuracy, privacy, security, and compliance of the system, making it a powerful solution for handling complex IoT data and supporting content verification processes.

Integrating machine learning, NLP, privacy-preserving techniques, blockchain, and smart contracts into the Meta-Content Enabler (MCE) system elevates its capabilities to provide advanced metadata analysis, real-time indexing, and content verification. This combination of cutting-edge technologies empowers the system to address complex data challenges and enhance the accuracy, privacy, security, and compliance of content verification processes.

Machine learning algorithms are employed to analyze metadata patterns, identify anomalies, and extract meaningful insights from large datasets. This enables the system to detect subtle irregularities in content, predict potential issues, and gain a deeper understanding of content characteristics.

Natural Language Processing (NLP) techniques are utilized to process and analyze textual content, enabling the system to extract semantic meaning, identify entities, and classify content based on its linguistic features. This facilitates a more comprehensive and contextual understanding of content, enhancing the effectiveness of content verification.

Privacy-preserving techniques, such as differential privacy and secure multi-party computation, are integrated to protect sensitive metadata while enabling its analysis and processing. This ensures that data privacy is protected even when data is shared or analyzed across multiple parties.

Blockchain technology is leveraged to provide an immutable and tamper-proof ledger for metadata and content verification records. This distributed ledger ensures the integrity and authenticity of data, preventing unauthorized modifications or manipulation.

Smart contracts are utilized to automate and enforce content verification rules, ensuring consistent and reliable verification processes. These self-executing contracts execute predetermined actions based on predefined conditions, streamlining content verification workflows, and reducing the risk of human error.

By incorporating these advanced technologies, the MCE system offers several benefits for handling complex IoT data and supporting content verification processes. The application of machine learning and NLP techniques enhances the accuracy of metadata analysis and content verification, enabling the system to identify subtle irregularities and extract meaningful insights. Integrating privacy-preserving techniques ensures that sensitive metadata and content remain secure and confidential, even when shared or analyzed across multiple parties. Improved Blockchain technology provides security with an immutable and tamper-proof ledger for data, safeguarding it from unauthorized modifications and ensuring data integrity. Smart contracts enforce content verification rules and automate compliance-related tasks, reducing the risk of non-compliance and ensuring adherence to data privacy regulations. The automation of content verification processes through smart contracts streamlines workflows, reduces manual intervention, and improves overall efficiency.

The new system, equipped with advanced machine learning, NLP, privacy-preserving techniques, blockchain, and smart contracts, powerfully solves handling complex IoT data and supporting content verification processes. Its ability to deliver accurate, secure, and compliant content verification makes it a valuable tool for organizations across industries.

The disclosed combination of real-time monitoring, multidimensional verification, and blockchain-based storage enables the MCE system to provide a robust and efficient solution for ensuring the accuracy and integrity of user activities. The system's ability to detect anomalies promptly, verify findings rigorously, and maintain data integrity makes it a valuable tool that prioritize data security, compliance, and user trust, and overcomes the limitations of the prior art.

This system enhances the content verification process by providing real-time processing, secure data storage through a multidimensional cross-node hash chain, and proactive identification of content discrepancies. They address important aspects such as real-time processing, scalability, data integrity, privacy, machine learning integration, and customization, making the plugin a powerful tool for efficient and reliable content verification.

Thus, the multidimensional, cross-node, hashchain, network-based Meta-Content Enabler helps in real time anomaly detection and impact analysis across the board. The hexadecimal identifier is the unique sequence identifier that gets generated based on the real time indexing and categorization to create a golden virtual metadata copy. This metadata copy is used by AI engine to determine the score of any content to identify the degree of deviation. This identifier also helps in identifying the hexadecimal nodes in a cross-node multidimensional hashchain. The meta-content enabler identified the discrepancies on real time based on the degree of deviation from the golden metadata sets and highlights the user. The identified discrepancy is verified across cross-node hashchains to give end to end parallel impact analysis on the anomaly. This ensures the accuracy and validity of content associated with user activities. By leveraging real-time monitoring, multidimensional verification, and blockchain-based storage, the system provides a robust and efficient solution for ensuring the accuracy and integrity of user activities. The system integrates privacy-preserving techniques, such as differential privacy or secure multi-party computation, to protect sensitive metadata. These techniques enable the system to analyze and process the metadata while preserving the privacy of individual users. This ensures compliance with privacy regulations and builds trust among users.

In some arrangements, a real-time process for content-based anomaly detection and rectification can be used that comprises the steps of: generating, by an artificial-intelligence (AI) process, metadata related to content interactions, said AI process integrated with a plurality of internet of things (IoT) devices, applications, and systems; continuously monitoring, by a plurality of monitoring nodes distributed across a cross-node multidimensional hashchain network, the content interactions in real time; continuously capturing, by the plurality of monitoring nodes, metadata for the content interactions; processing, by a processing layer in the plurality of monitoring nodes, the metadata to parse the metadata, detect events, and extract content; performing, by the processing layer, tokenization and categorization in order to process and index the metadata into tokenized categories based on predefined criteria or dynamically adapting rules; generating, by a training model layer in the plurality of monitoring nodes, a golden virtual metadata copy which represents a trusted reference point for content analysis and comparison, the golden virtual metadata copy being formed from a unique hexadecimal sequence identifier generated based on the indexing and categorization of the metadata; scoring, by an AI engine in real time, the content in order to identify a degree of deviation from an expected pattern or standard; performing, by a cross-node multidimensional hashchain in the plurality of monitoring nodes, real-time indexing in order to align tokenized categories in the hashchain to share e-ledgers in a blockchain for real-time identification and to form a second chain with shared hash nodes for multidimensional hashed structures, wherein the multidimensional hashed structures can be referenced in any order to determine an anomaly in real time; analyzing, by a meta-content enabler in the plurality of monitoring nodes, the golden virtual metadata copy by referencing the AI engine for scoring and cross-referencing the hashchains to identify, based on the degree of deviation, said anomaly in plurality of monitoring nodes and in the shared hash nodes for the hashchains that are related; validating, by a real-time reconciler in the plurality of monitoring nodes, accuracy and legitimacy of the content based on the shared hash nodes and the golden virtual metadata copy; generating, by a user response evaluator in the plurality of monitoring nodes, real-time user notifications and mitigation suggestions for the anomaly; and synchronizing, by the user response evaluator, the real-time user notifications and mitigation suggestions across the plurality of monitoring nodes.

In some arrangements, the unique hexadecimal sequence identifier has semantic meaning.

In some arrangements, the metadata is processed and indexed by AI transformers.

In some arrangements, for any anomaly that is detected the shared hash node is flagged and corresponding categories are reconciled.

In some arrangements, the metadata includes attributes, properties, sender information, recipient information, and timestamps.

In some arrangements, the processing layer operates continuously as a background process.

In some arrangements, the golden virtual metadata copy aggregates and consolidates the metadata that is relevant and ensures data integrity and a reliable reference point.

In some arrangements, the golden virtual metadata copy is connected to the cross-node multidimensional hashchain, which incorporates multiple dimensions that include time, location, and user into a hashing process in order to ensure integrity of the content across said multiple dimensions.

In some arrangements, additional steps may include the step of storing, by a blockchain layer in the plurality of monitoring nodes, the multidimensional cross-node hash chain in the blockchain and facilitates decentralized and secure storage, said blockchain ensuring immutability, transparency, and auditability of the golden virtual metadata copy.

In some arrangements, the meta-content enabler uses pattern matching, machine learning, and contextual analysis to identify and flag potential discrepancies in the content.

In some arrangements, the real-time indexing in the cross-node multidimensional hash chain performs the steps of: receiving the content to be indexed and verified in real-time; applying a cryptographic hash function to the content and generating a unique hash value that represents the data integrity of the content; retrieving a previously generated hash value from the hashchain; comparing the previously generated hash value to the unique hash value for the content; performing hash linking; storing the content and the unique hash value in memory; and updating a reference to the previously generated hash value in the hashchain in order to provide a link to the unique hash value that is current.

In some arrangements, the cryptographic hash function is executed again when the content is being retrieved in order to verify whether the content is authentic.

In some arrangements, the potential discrepancies that are flagged and handled by: flagging the content as potentially modified or tampered if the unique hash value does not match the previously generated hash value; performing analysis to determine an extent and nature of the discrepancies; and applying digital forensics to identify specific changes or modifications in the content.

In some arrangements, the meta-content enabler performs the functions of the digital forensics, cross-referencing and comparison, AI and machine learning analysis, contextual analysis, detection of said discrepancies, and visualization.

In some arrangements, the metadata is processed and indexed into said tokenized categories based on predefined criteria.

In some arrangements, the metadata is processed and indexed into said tokenized categories based on dynamically adapting rules.

In some arrangements, a real-time process for content-based anomaly detection and rectification in a cross-node multidimensional hashchain network can comprise the steps of: continuously monitoring user activities in real time using a plurality of monitoring nodes distributed across the network, wherein each of said plurality of monitoring nodes capture and transmit real-time metadata about user activities to a central processing unit (CPU); generating, by the CPU, unique hexadecimal identifiers for said real-time metadata; assigning, by the CPU, scores to said real-time metadata based on deviations from golden metadata, wherein the golden metadata represents the metadata in original and unaltered form, said golden metadata and is stored in a secure and tamper-proof blockchain; detecting, by the CPU, anomalies from the scores based on the deviations of the real-time metadata from the golden metadata; verifying, by the CPU, the anomalies across multiple cross-node hashchains in the network, wherein the anomalies are verified by comparing the real-time metadata across multiple of said plurality of nodes; cross-referencing, by the CPU, the anomalies with various metadata sources, including user behavior patterns, network traffic patterns, and historical data, to provide context for assessment and root cause identification; analyzing, by the CPU, the context in real time using an artificial-intelligence (AI) engine to confirm said anomalies based on discrepancies and assess impact of the anomalies, wherein AI engine is trained by machine learning on a dataset of historical data and is capable of detecting irregularities and patterns in said user activities; and proactively flagging, by the CPU discrepancies to a content verification process to rectify the anomalies, wherein the discrepancies that are flagged are prioritized based on their severity and impact.

In some arrangements, one or more various steps or processes disclosed can be implemented in whole or in part as computer-executable instructions (or as computer modules or in other computer constructs) stored on computer-readable media. Functionality and steps can be performed on a machine or distributed across a plurality of machines in communication with one another.

These and other features, and characteristics of the present technology, as well as the methods of operation and functions of the related elements of structure and the combination of parts and economies of manufacture, will become more apparent upon consideration of the following description and the appended claims with reference to the drawings, which form a part of this specification, wherein like reference numerals designate corresponding parts in the figures. It is to be understood, however, that the drawings are for illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the drawings, which form a part hereof, and in which is shown byway of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

Figure 1:
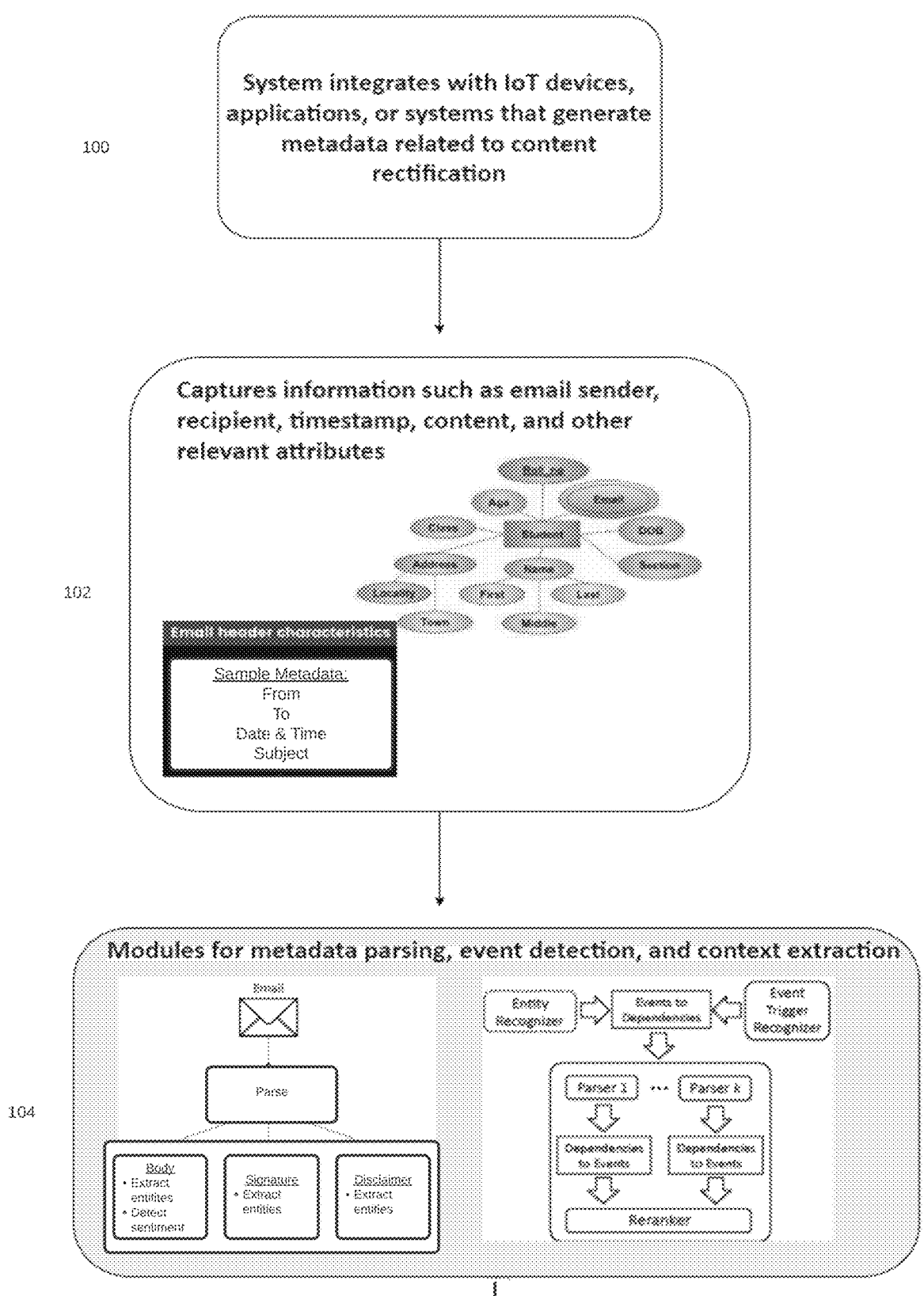
FIG. 1 depicts flow functionality conceptually showing sample interactions, steps, functions, and components under one or more aspects of this disclosure.

FIG. 1 depicts flow functionality conceptually showing sample interactions, steps, functions, and components under one or more aspects of this disclosure.

In 100, the system integrates with IoT devices, applications, or systems that generate metadata related to content rectification.

In the example of an email situation, the system, as in 102, captures information such as email sender, recipient, time stamps, content, and other metadata or relevant attributes.

This is passed to one or more modules 104 for metadata parsing, event detection, and content extraction. For example, an email may be parsed, as shown, into a body, signature, and email disclaimer portion. Entity information may be extracted from the body, signature, and email disclaimer. Further, sentiment may be determined from the email body.

As further in 104, an entity recognizer and an event trigger recognizer can inform correlate events to dependencies. Information may be parsed by Parser 1, Parser 2, . . . Parser K, which correlates dependencies to events that can be reranked by as appropriate.

Figure 2:
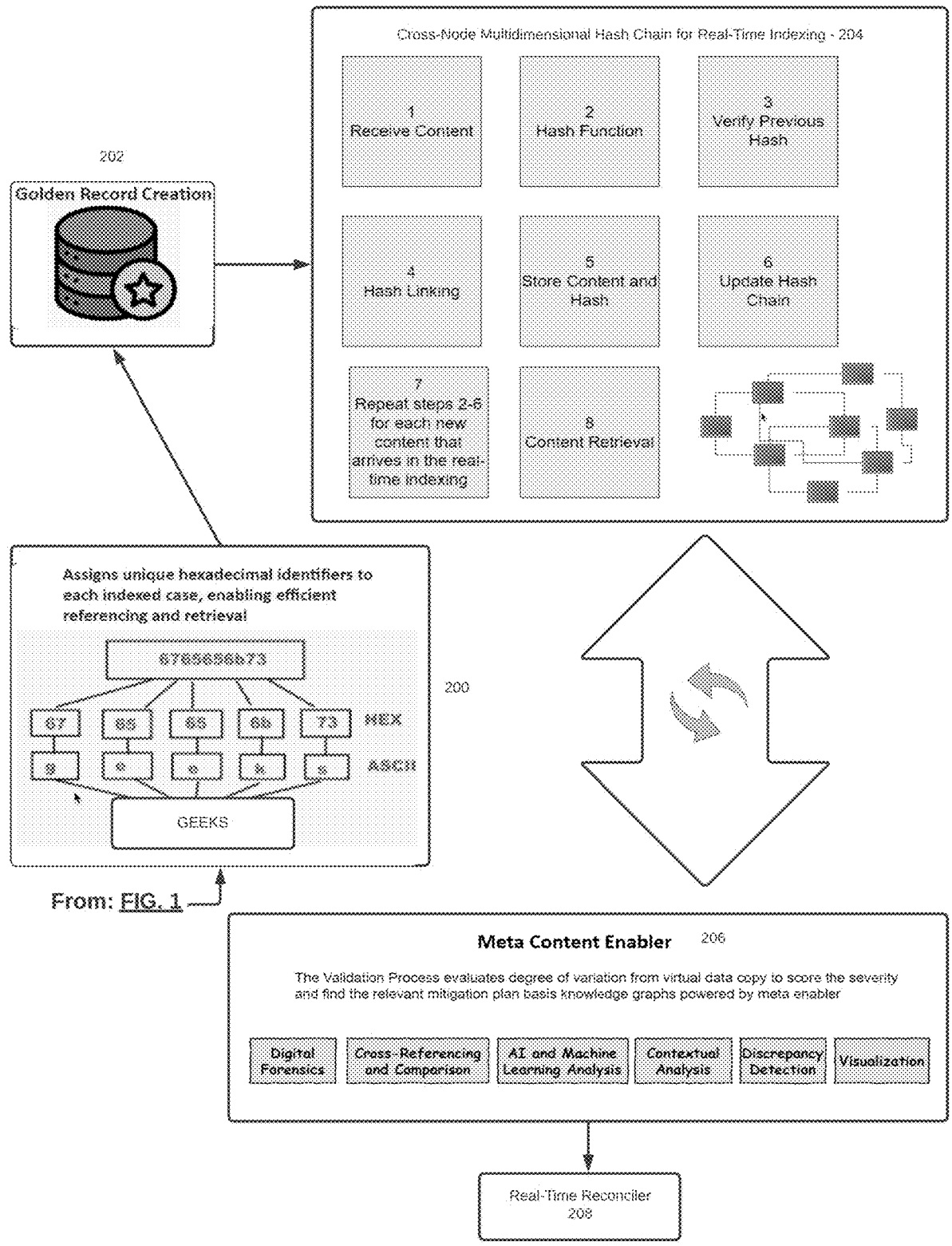
FIG. 2 continues with additional depicted flow functionality conceptually showing sample interactions, steps, functions, and components under one or more aspects of this disclosure, including functional illustrations for the cross-node multidimensional hash chain for real-time indexing and the meta content enabler.

The process proceeds to FIG. 2, which continues with additional depicted flow functionality conceptually showing sample interactions, steps, functions, and components under one or more aspects of this disclosure, including functional illustrations for the cross-node multidimensional hash chain for real-time indexing and the meta content enabler.

As a preliminary matter, a cross-node multi-dimensional hashchain refers to a cryptographic metadata structure that combines elements of a hashchain and a multidimensional data structure. A hashchain is a sequence of hash functions applied iteratively to data, where the output of each hash function becomes the input for the next one. This ensures the integrity and authenticity of the data, as any modification in the chain would be detected by a mismatch in subsequent hash values.

In a multidimensional data structure, data is organized in multiple dimensions, such as a grid, tree, or graph. Each element in the structure has a set of coordinates that determine its position within the dimensions.

A cross-node multi-dimensional hashchain combines these concepts by creating a hashchain where each hash value corresponds to a specific location within a multidimensional data structure. The coordinates of each element within the data structure are used as inputs for the hash function. The resulting hash value becomes the coordinate for the next element in the hashchain, forming a cross-node network of hash values.

This structure allows for the verification of both the integrity of individual elements within the multidimensional data structure and the integrity of the overall hashchain. Modifying any element in the structure or altering the order of the hashchain would result in inconsistencies and would be detectable through the hash values.

Cross-node multi-dimensional hashchains have potential applications in various fields, such as data integrity verification, blockchain technology, distributed systems, and secure data storage. They provide an additional layer of security and tamper resistance by combining the properties of hashchains and multidimensional data structures.

A cross-node multi-dimensional hashchain can be beneficial in the context of real-time indexing by providing efficient and reliable data organization and retrieval. The multidimensional nature of the hashchain allows for efficient indexing of metadata. Each element within the multidimensional structure can be uniquely identified by its coordinates, which are derived from the hash values. This enables fast and direct access to specific data points, even in large datasets.

As new data is added to the multidimensional hashchain, the hash values and coordinates are recalculated, ensuring the integrity of the structure. Using a hashchain allows for real-time updates, as each new element can be easily appended to the existing structure. This is useful in scenarios where data is constantly changing or being added.

The hashchain provides tamper resistance, as any modification to the data or the order of elements would result in inconsistencies in subsequent hash values. This makes it highly secure and reliable for indexing purposes, ensuring the integrity and authenticity of the indexed data.

The hashchain allows for efficient verification of data integrity. By recalculating the hash values and comparing them to the stored values, one can quickly determine if any modifications have occurred. This is especially important in real-time indexing, where the integrity of the indexed metadata needs to be ensured continuously.

The structure of a cross-node multi-dimensional hashchain lends itself well to parallel processing.

Real-time indexing allows users to perform efficient searches and filtering based on the latest metadata attributes. This is crucial in applications where users need to locate specific content quickly and accurately.

In systems with dynamic metadata content, real-time indexing allows for seamless integration of new metadata fields or modifications to existing ones, providing flexibility and adaptability.

Referring to FIG. 2, unique hexadecimal identifiers are assigned to each indexed case, enabling efficient referencing and retrieval in 200. Stated differently, each piece of metadata generated by MCE is assigned a unique hexadecimal identifier. This identifier serves multiple purposes, including tracking metadata across the hashchain network, facilitating anomaly identification, and enabling efficient data retrieval. The advanced hexadecimal identifiers assigned to indexed cases are not simply random values. They are generated using an algorithm that incorporates various attributes from the metadata. For example, the hexadecimal identifiers can be broken out into individual elements that each correspond to a specific ASCII character. Collectively they can form a word or phrase that is semantically recognizable and understandable. This approach ensures uniqueness and integrity of the identifiers, facilitating efficient referencing and retrieval of specific content-related cases. Beyond mere uniqueness, the hexadecimal identifiers encode semantic meaning, providing contextual information about the metadata they represent. This semantic enrichment enhances the system's ability to interpret and analyze metadata effectively, facilitating more informed decision-making.

Hexadecimal identifiers have multiple benefits due to their unique identification and semantic meaning combined. Context-aware processing is one. Because the hexadecimal identifiers have semantic meaning incorporated in them, the system can process and analyze metadata while taking the unique properties and relationships of the data into account. The technology delivers increased anomaly detection by recognizing patterns that could otherwise go missed and by comprehending the semantic meaning of the metadata. When anomalies are found, the semantic data linked to the hexadecimal identifiers aids in determining the significance of the abnormalities and determining the order of importance for remedial measures. Hexadecimal identification semantic enrichment makes data governance easier by allowing the system to efficiently classify and arrange metadata, guaranteeing compliance with data policies and laws.

The process proceeds with golden record creation and storage in 202. The hexadecimal identifier is the unique sequence identifier that gets generated based on the real-time indexing and categorization to create the golden virtual metadata copy.

A cross-node multidimensional hash chain for real-time indexing is illustrated in 204. Hash nodes share the ledger basis categorizations and are arranged in hashchains. These hashchains overlap for the shared categories and form a tangled hashchain network. For any anomaly detected, the hash node is flagged, and corresponding categories reconcile their data. If the hash node is a shared node, the
    overlapped chain is also evaluated for any discrepancy.
       This ensures thorough real-time validation and from
       more than one dimension checks for optimized results.

The first step is to receive content. The content to be indexed and verified in real time, such as documents, files, or data streams, is received. Next a cryptographic hash function is applied to the content to generate a unique hash value that represents the contents integrity. Third, the previously generated hash value is retrieved from the chain or initialized as the genesis hash if it is the first content, and is compared to the computed hash value of the current content. The fourth step is hash linking. If the computed hash value matches the previous hash, then the process proceeds to step five. If not, the computation indicates that the content has been modified or tampered with, and appropriate actions should be taken such as flagging the content as suspicious or notifying a system administrator. Fifth, the content and corresponding hash value is stored in the real time indexing system or database. The content along with its unique identifier is stored in an index database or data structure for efficient retrieval. The sixth step is to update the hash chain. In particular the reference to the latest hash value in the chain is updated to link it to the current content. Seventh, the process is repeated for new content. Steps two through six are repeated for each new content that arrives in the real-time indexing system. Last is content retrieval in step eight. When retrieving indexed content, the hash value is computed again and compared to the stored hash value. If they match, the content is considered authentic and has not been tampered with.

The process proceeds with the MCE 206 in which a validation process evaluates the degree of variation from virtual data copy to score the severity and find the relevant mitigation plan basis and knowledge graphs can be utilized. This involves digital forensics, cross referencing and comparison, artificial intelligence and machine learning analysis, contextual analysis, discrepancy detection and visualization.

Regarding digital forensics, forensic analysis is conducted on the content examining metadata, file structures, embedded information, or hidden data. Potential alterations manipulations or signs of tampering are identified.

Regarding cross referencing and comparison, the content is compared with other reliable sources, versions, or databases to identify inconsistencies, discrepancies, or plagiarized sections. Instances of misinformation, fabricated content or duplicated information architected.

For artificial intelligence and machine learning analysis, AI and ML learning techniques are utilized to analyze patterns, identify anomalies, and flag potentially suspicious content.

For contextual analysis, the broader context surrounding the content is considered, such as social media discussions, news reports, or expert opinions. Corroborating or contradicting information can be looked for to assess the credibility and accuracy of the content.

Regarding discrepancy detection, based on the analysis and comparisons, the system detects any discrepancies, misinformation, or inconsistencies present in the content.

Regarding visualization the findings may be presented, if desired, in a visual format such as charts, graphs, or reports, to provide a clear overview of the detected discrepancies or inconsistencies.

After addressing content verification and discrepancy handling, as detailed in FIG. 3A and FIB. 3B (detailed below), output is provided to a real time reconciler in 208.

Figures 3A, 3B:
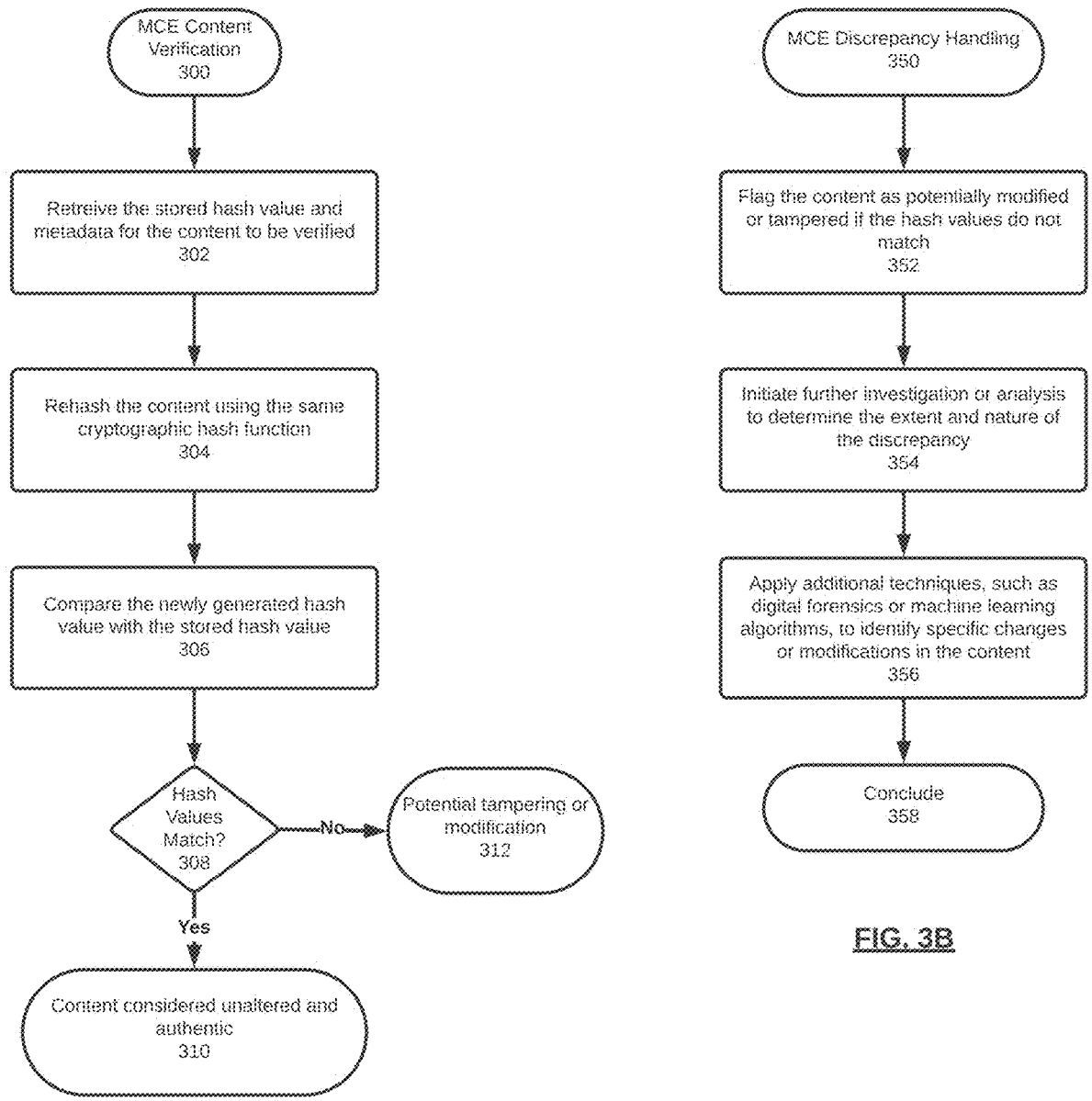
FIG. 3A depicts flow functionality conceptually showing sample interactions, steps, functions, and components under one or more MCE content validation aspects of this disclosure.
FIG. 3B depicts flow functionality conceptually showing sample interactions, steps, functions, and components under one or more MCE discrepancy handling aspects of this disclosure.

FIG. 3A depicts flow functionality conceptually showing sample interactions, steps, functions, and components under one or more MCE content verification aspects of this disclosure.

The first step of content verification 300 is to retrieve the stored hash value and metadata for the content to be verified in 302. Next, the content is rehashed using the same cryptographic hash function in 304. Then, the newly generated hash value is compared against with the stored hash value in 306. If the hash value is match in 308, then the content is considered unaltered and authentic in 310. Otherwise, the content is considered to have been potentially tampered with or otherwise modified.

FIG. 3B depicts flow functionality conceptually showing sample interactions, steps, functions, and components under one or more MCE discrepancy handling aspects of this disclosure.

The first step of discrepancy handling 350 is to flag the content as potentially modified or tampered if the hash values do not match in 352. Next further investigation or analysis is initiated to determine the extent and nature of the discrepancy in 354. Then, additional techniques are applied, such as digital forensics or machine learning algorithms to identify specific changes or modifications in the content in 356.

Figure 4:
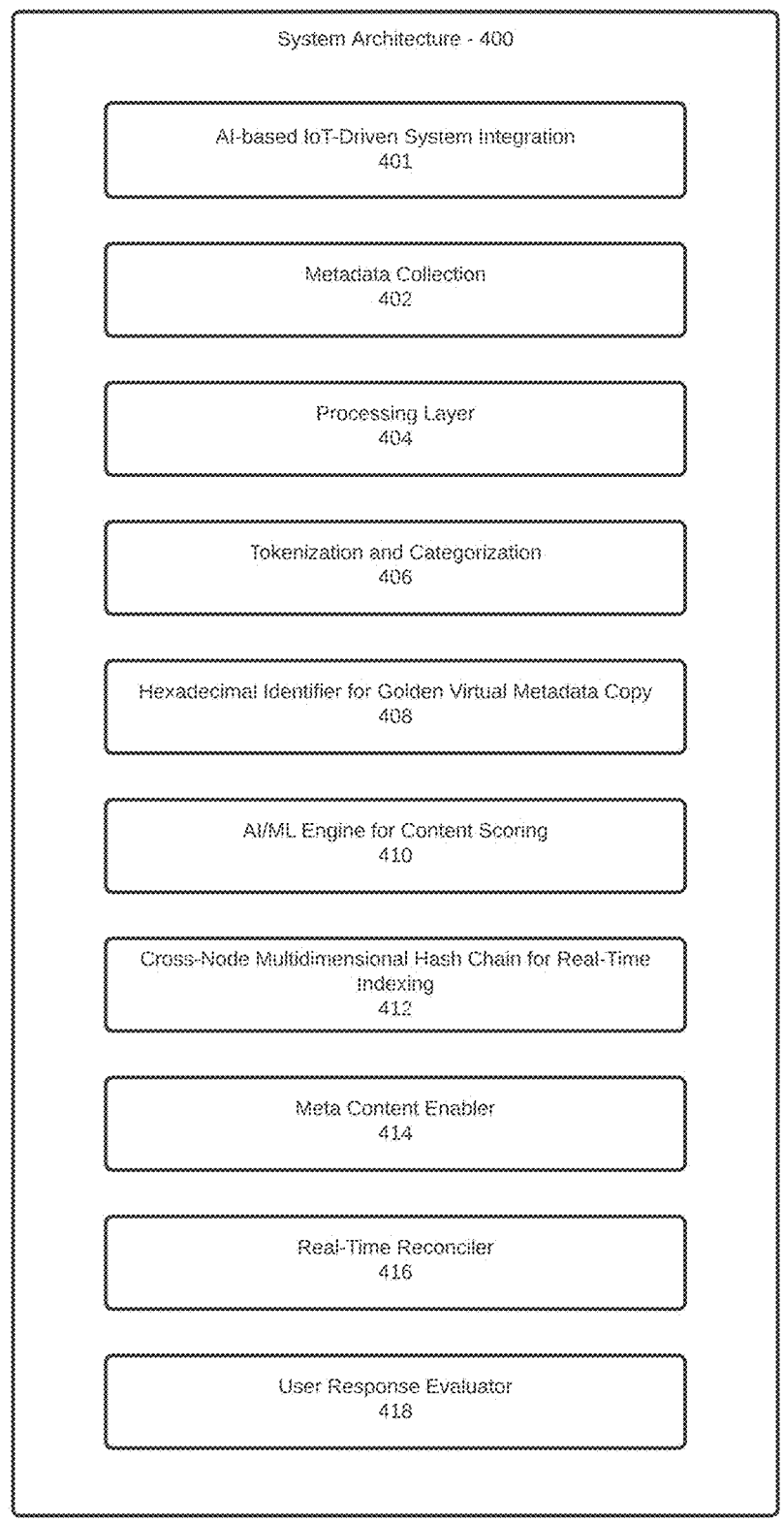
FIG. 4 depicts a sample, functional, technical/representative architectural diagram showing sample interactions, steps, functions, and components under one or more aspects of this disclosure.

FIG. 4 depicts a sample, functional, technical/representative architectural diagram showing sample interactions, steps, functions, and components under one or more aspects of this disclosure.

As shown in FIG. 4, system architecture 400 includes: AI-based IoT-driven system integration 401, metadata collection 402, processing layer 404, tokenization and categorization 406, hexadecimal identifier for golden virtual metadata copy 408, AI/ML engine for content scoring 410, cross-node multidimensional hash chain for real-time indexing 412, meta content enabler 414, real-time reconciler 416, and user response evaluator 418.

Regarding AI-based IoT-driven system integration 401, the system integrates with IoT devices, applications, or systems that generate metadata related to content interactions.

Regarding metadata collection 402, metadata and other relevant attribute parameters are captured.

Regarding processing layer 404, it includes modules for metadata parsing, event detection, and context extraction.

Regarding tokenization and categorization 406, this processes and indexes metadata into tokenized categories based on predefined criteria or dynamically adapting rules.

Regarding hexadecimal identifier for golden virtual metadata copy 408, a training model layer creates a golden virtual metadata copy, which represents a trusted reference point for content analysis and comparison.

Regarding AI/ML engine for content scoring 410, this scoring mechanism helps identify the degree of deviation or divergence from the expected patterns or standards. It enables efficient content analysis and assessment in real-time.

Regarding cross-node multidimensional hash chain for real-time indexing 412, tokenized categories are aligned in hashchains to share the e-ledgers for quick real time identification. These e-ledgers also help to extend the category tokens to form another chain with shared hash-nodes forming a multidimensional hashed structure. These multidimensional structures can be referenced in any order to determine anomalies in real time.

Regarding meta content enabler 414, the trusted golden copy parameters are referenced by the AI engine for scoring and are cross referenced in hashchains to identify any anomaly at the hash nodes. In case of shared nodes all the related hashchains are identified for real-time reconciliation.

Regarding real-time reconciler 416, algorithms verify and validate the accuracy and legitimacy of the data.

MCE 414 and reconciler 416 cooperate to identify the degree of variation and the appropriate solution slash write recommendation to the problem and are closely integrated with the cross-node network to form knowledge graphs basis golden metadata or the like. Verifications of shared hash nodes and golden records are provided to the meta-content enabler.

Regarding user response evaluator 418, real-time user notification and mitigation suggestions are provided. Response tracking helps provide in optimized results for the next cycle of evaluation and is synced across nodes.

The following provides additional commentary and details regarding architecture that is utilized.

Regarding data sources, the plugin integrates with IoT devices, applications, or systems that generate metadata related to content interactions. These data sources can include servers, attributes, IoT sensors, user applications, or any other relevant sources.

For metadata collection, the plugin collects the metadata generated by the data sources in real-time. It captures information such as attribute, properties, sender, recipient, timestamp, content, and other relevant attributes.

Regarding the processing layer, it consists of components responsible for real-time processing and analysis of the incoming metadata. It includes modules for metadata parsing, event detection, and context extraction. The meta content enabler component operates in the background, analyzing content for discrepancies and anomalies.

For real-time indexing and categorization, once the metadata is processed, this layer performs real-time indexing and categorization of content related cases. It uses algorithms to identify relevant categories, such as sender, recipient, subject, and content. Each case is assigned a unique hexadecimal identifier for reference.

Regarding the hexadecimal identifier generator, this component generates unique hexadecimal identifiers for each indexed content case. These identifiers serve as references to the specific cases and facilitate efficient retrieval and tracking.

For golden record creation, the indexed cases are used to create a golden record, which serves as a comprehensive and authoritative version of the content-related metadata. The golden record aggregates and consolidates the relevant metadata, ensuring data integrity and providing a reliable reference point.

The golden record is connected to a multi-dimensional cross-node hash chain, which incorporates multiple dimensions (e.g., time, location, user) into the hashing process. This ensures the integrity and tamper-proof nature of the content related data across different dimensions.

Blockchain integration is included in the architecture as a blockchain layer that stores the multi-dimensional cross-node hash chain and facilitates decentralized and secure data storage. The blockchain ensures immutability, transparency, and auditability of the golden record, enhancing the overall security and trustworthiness of the content verification process.

Regarding content verification and discrepancy detection, the MCE component continuously works in the background, analyzing content for discrepancies and anomalies. It leverages various techniques, such as pattern matching, machine learning, or contextual analysis, to identify and flag potential discrepancies in content during usage.

For content verification integration, the system integrates with content verification services or algorithms to validate the accuracy and legitimacy of contents. It leverages external verification mechanisms to cross-reference and validate the content associated with the indexed cases.

For evaluation tracking, the plugin may include a user interface that provides real-time insights, analytics, and reporting functionalities. Users can access dashboards or reports to monitor content-related activities, identify discrepancies, and take necessary actions based on the provided insights.

Figure 5:
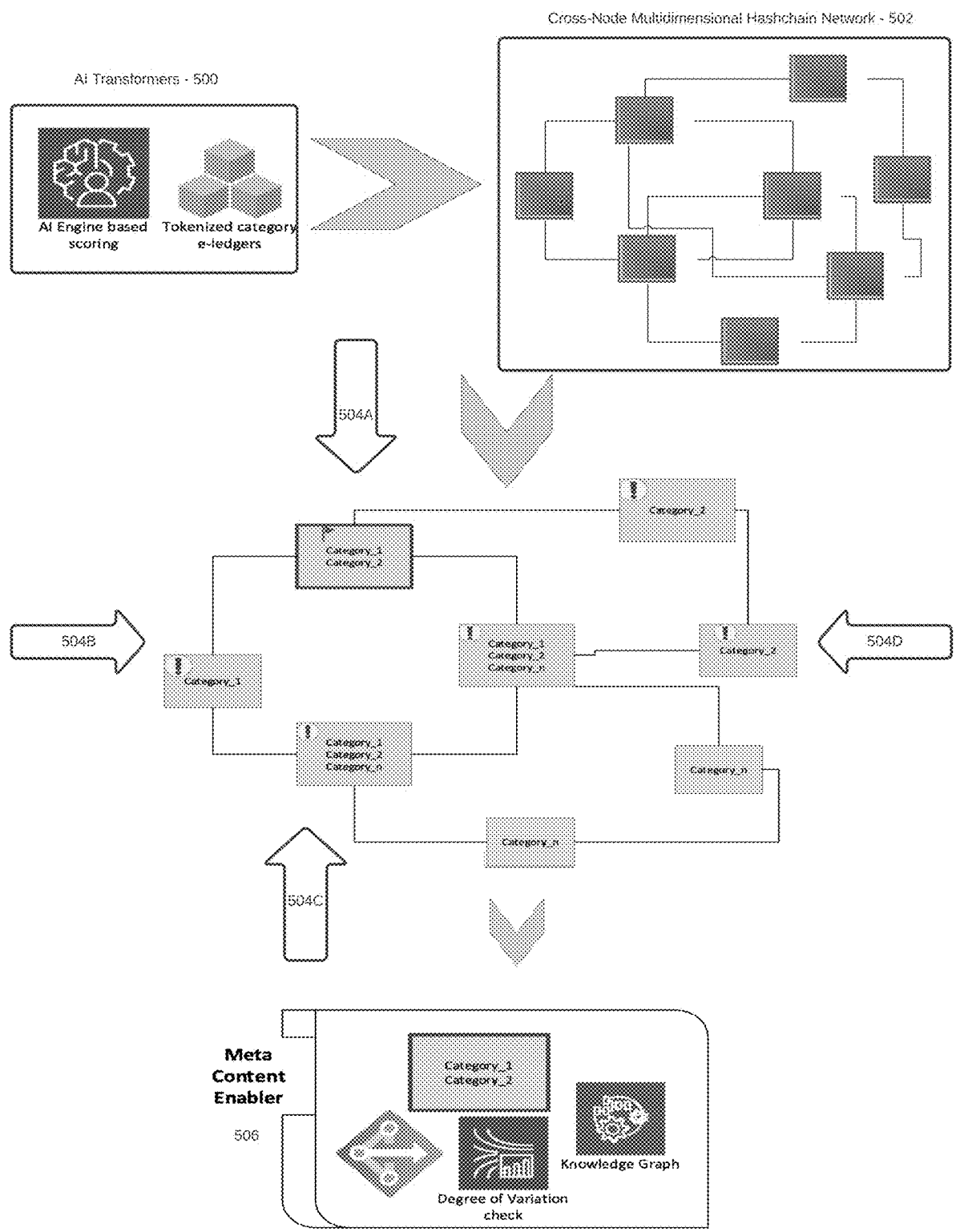
FIG. 5 depicts a sample, functional, technical/representative process illustration diagram with flow functionality conceptually showing sample interactions, steps, functions, and components under one or more aspects of this disclosure.

FIG. 5 depicts a sample, functional, technical/representative process illustration diagram with flow functionality conceptually showing sample interactions, steps, functions, and components under one or more aspects of this disclosure.

In this process illustration, the captured metadata is processed in 500 by AI transformers and basis pre-existing conditions and user customization to form relevant indexed categories.

In the cross-node multidimensional hash chain network 502, the hash nodes share the ledgers basis categorization and arrange and hash chains. These hash change overlap for the shared categories and form a tangled hash chain network.

The MCE component working can operate in the background to continuously monitor content rectification during application usage from all directions (e.g., 504A, 504B, 504C, 504D) using AI transformers. This feature allows for real-time identification of discrepancies or inconsistencies. By proactively flagging these discrepancies, the system supports the content verification process by improving the accuracy and reliability of the shared information. The MCE employs AI transformers to enhance the accuracy and reliability of content verification. AI transformers are trained on massive amounts of text data, enabling them to detect subtle nuances and patterns in language. This sophistication allows the MCE to identify discrepancies that might go unnoticed by traditional methods. When discrepancies are identified, the MCE proactively flags them to the content verification process. This proactive approach ensures that potential issues are addressed promptly, preventing them from causing harm or propagating misinformation.

For any anomaly identified, the hash node is flagged and corresponding categories do a thorough reconciliation for their data as well. If the hash node is a shared node, the overlapped chain is also evaluated for any discrepancy. This ensures, thorough real time validation and from more than one dimension, checks for optimized results are performed.

In MCE 506, the validation process evaluates degree of variation from virtual metadata copy to score the severity and find the relevant immediate mitigation plan.

Although the present technology has been described for illustration based on what is currently considered the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A real-time process for content-based anomaly detection and rectification comprising the steps of:
generating, by an artificial-intelligence (AI) process, metadata related to content interactions, said AI process integrated with a plurality of internet of things (IoT) devices, applications, and systems;
continuously monitoring, by a plurality of monitoring nodes distributed across a cross-node multidimensional hashchain network, the content interactions in real time;
continuously capturing, by the plurality of monitoring nodes, metadata for the content interactions;
processing, by a processing layer in the plurality of monitoring nodes, the metadata to parse the metadata, detect events, and extract content;
performing, by the processing layer, tokenization and categorization in order to process and index the metadata into tokenized categories based on predefined criteria or dynamically adapting rules;
generating, by a training model layer in the plurality of monitoring nodes, a golden virtual metadata copy which represents a trusted reference point for content analysis and comparison, the golden virtual metadata copy being formed from a unique hexadecimal sequence identifier generated based on the indexing and categorization of the metadata;
scoring, by an AI engine in real time, the content in order to identify a degree of deviation from an expected pattern or standard;
performing, by a cross-node multidimensional hashchain in the plurality of monitoring nodes, real-time indexing in order to align tokenized categories in the hashchain to share e-ledgers in a blockchain for real-time identification and to form a second chain with shared hash nodes for multidimensional hashed structures, wherein the multidimensional hashed structures can be referenced in any order to determine an anomaly in real time;
analyzing, by a meta-content enabler in the plurality of monitoring nodes, the golden virtual metadata copy by referencing the AI engine for scoring and cross-referencing the hashchains to identify, based on the degree of deviation, said anomaly in plurality of monitoring nodes and in the shared hash nodes for the hashchains that are related;
validating, by a real-time reconciler in the plurality of monitoring nodes, accuracy and legitimacy of the content based on the shared hash nodes and the golden virtual metadata copy; and
generating, by a user response evaluator in the plurality of monitoring nodes, real-time user notifications and mitigation suggestions for the anomaly; and synchronizing, by the user response evaluator, the real-time user notifications and mitigation suggestions across the plurality of monitoring nodes.

2. The real-time process of claim 1 wherein the unique hexadecimal sequence identifier has semantic meaning.

3. The real-time process of claim 2 wherein the metadata is processed and indexed by AI transformers.

4. The real-time process of claim 3 wherein for any said anomaly that is detected the shared hash node is flagged and corresponding categories are reconciled.

5. The real-time process of claim 4 wherein the metadata includes attributes, properties, sender information, recipient information, and timestamps.

6. The real-time process of claim 5 wherein the processing layer operates continuously as a background process.

7. The real-time process of claim 6 wherein the golden virtual metadata copy aggregates and consolidates the metadata that is relevant and ensures data integrity and a reliable reference point.

8. The real-time process of claim 7 wherein the golden virtual metadata copy is connected to the cross-node multidimensional hashchain, which incorporates multiple dimensions that include time, location, and user into a hashing process in order to ensure integrity of the content across said multiple dimensions.

9. The real-time process of claim 8 further comprising the step of storing, by a blockchain layer in the plurality of monitoring nodes, the multidimensional cross-node hash chain in the blockchain and facilitates decentralized and secure storage, said blockchain ensuring immutability, transparency, and auditability of the golden virtual metadata copy.

10. The real-time process of claim 9 wherein the meta-content enabler uses pattern matching, machine learning, and contextual analysis to identify and flag potential discrepancies in the content.

11. The real-time process of claim 10 wherein the real-time indexing in the cross-node multidimensional hash chain performs the steps of:
    receiving the content to be indexed and verified in real-time;
    applying a cryptographic hash function to the content and generating a unique hash value that represents the data integrity of the content;
    retrieving a previously generated hash value from the hashchain;
    comparing the previously generated hash value to the unique hash value for the content;
    performing hash linking;
    storing the content and the unique hash value in memory; and
    updating a reference to the previously generated hash value in the hashchain in order to provide a link to the unique hash value that is current.

12. The real-time process of claim 11 wherein the cryptographic hash function is executed again when the content is being retrieved in order to verify whether the content is authentic.

13. The real-time process of claim 12 wherein the potential discrepancies that are flagged and handled by:
    flagging the content as potentially modified or tampered if the unique hash value does not match the previously generated hash value;
    performing analysis to determine an extent and nature of the discrepancies; and
    applying digital forensics to identify specific changes or modifications in the content.

14. The real-time process of claim 13 wherein the meta-content enabler performs the functions of the digital forensics, cross-referencing and comparison, AI and machine learning analysis, contextual analysis, detection of said discrepancies, and visualization.

15. The real-time process of claim 14 wherein the metadata is processed and indexed into said tokenized categories based on predefined criteria.

16. The real-time process of claim 14 wherein the metadata is processed and indexed into said tokenized categories based on dynamically adapting rules.

17. A real-time process for content-based anomaly detection and rectification, comprising the steps of:
    generating, by an artificial intelligence (ai) process, metadata related to content interactions, said ai process integrated with a plurality of internet of things (iot) devices, applications, and systems;
    continuously monitoring, by a plurality of monitoring nodes distributed across a cross-node multidimensional hashchain network, the content interactions in real time;
    continuously capturing, by the plurality of monitoring nodes, metadata for the content interactions;
    processing, by a processing layer in the plurality of monitoring nodes, the metadata to parse the metadata, detect events, and extract content;
    performing, by the processing layer, tokenization and categorization in order to process and index the metadata into tokenized categories based on predefined criteria or dynamically adapting rules;
    generating, by a training model layer in the plurality of monitoring nodes, a golden virtual metadata copy which represents a trusted reference point for content analysis and comparison, the golden virtual metadata copy being formed from a unique hexadecimal sequence identifier generated based on the indexing and categorization of the metadata;
    scoring, by an ai engine in real time, the content in order to identify a degree of deviation from an expected pattern or standard;
    performing, by a cross-node multidimensional hashchain in the plurality of monitoring nodes, real-time indexing in order to align tokenized categories in the hashchain to share e-ledgers in a blockchain for real-time identification and to form a second chain with shared hash nodes for multidimensional hashed structures, wherein the multidimensional hashed structures can be referenced in any order to determine an anomaly in real time;
    analyzing, by a meta-content enabler in the plurality of monitoring nodes, the golden virtual metadata copy by referencing the ai engine for scoring and cross-referencing the hashchains to identify, based on the degree of deviation, said anomaly in plurality of monitoring nodes and in the shared hash nodes for the hashchains that are related;
    validating, by a real-time reconciler in the plurality of monitoring nodes, accuracy and legitimacy of the content based on the shared hash nodes and the golden virtual metadata copy;
    generating, by a user response evaluator in the plurality of monitoring nodes, real-time user notifications and mitigation suggestions for the anomaly;
    synchronizing, by the user response evaluator, the real-time user notifications and mitigation suggestions across the plurality of monitoring nodes;

storing, by a blockchain layer in the plurality of monitoring nodes, the multidimensional cross-node hash chain in the blockchain and facilitates decentralized and secure storage, said blockchain ensuring immutability, transparency, and auditability of the golden virtual metadata copy; and using, by the meta-content enabler, pattern matching, machine learning, and contextual analysis to identify and flag potential discrepancies in the content, wherein: the unique hexadecimal sequence identifier has semantic meaning, the metadata is processed and indexed by ai transformers, the metadata includes attributes, properties, sender information, recipient information, and timestamps, the processing layer operates continuously as a background process, the golden virtual metadata copy aggregates and consolidates the metadata that is relevant and ensures data integrity and a reliable reference point, and the golden virtual metadata copy is connected to the cross-node multidimensional hashchain, which incorporates multiple dimensions that include time, location, and user into a hashing process in order to ensure integrity of the content across said multiple dimensions.

18. The real-time process of claim 17 wherein the unique hexadecimal sequence identifier has semantic meaning.

19. The real-time process of claim 18 wherein the unique hexadecimal identifiers have semantic meaning.

20. A real-time process for content-based anomaly detection and rectification in a cross-node multidimensional hashchain network comprising the steps of:

continuously monitoring user activities in real time using a plurality of monitoring nodes distributed across the network, wherein each of said plurality of monitoring nodes capture and transmit real-time metadata about user activities to a central processing unit (CPU);

generating, by the CPU, unique hexadecimal identifiers for said real-time metadata;

assigning, by the CPU, scores to said real-time metadata based on deviations from golden metadata, wherein the golden metadata represents the metadata in original and unaltered form, said golden metadata and is stored in a secure and tamper-proof blockchain;

detecting, by the CPU, anomalies from the scores based on the deviations of the real-time metadata from the golden metadata;

verifying, by the CPU, the anomalies across multiple cross-node hashchains in the network, wherein the anomalies are verified by comparing the real-time metadata across multiple of said plurality of nodes;

cross-referencing, by the CPU, the anomalies with various metadata sources, including user behavior patterns, network traffic patterns, and historical data, to provide context for assessment and root cause identification;

analyzing, by the CPU, the context in real time using an artificial-intelligence (AI) engine to confirm said anomalies based on discrepancies and assess impact of the anomalies, wherein AI engine is trained by machine learning on a dataset of historical data and is capable of detecting irregularities and patterns in said user activities; and proactively flagging, by the CPU discrepancies to a content verification process to rectify the anomalies, wherein the discrepancies that are flagged are prioritized based on their severity and impact.

* * * * *